United States Patent Office 2,951,876
Patented Sept. 6, 1960

2,951,876

PROCESS FOR PREPARING α-HALOGEN-β-HYDROXY ALCOHOLS

Irving Levi, Montreal, Quebec, Canada, assignor to Charles E. Frosst & Company, a corporation of Quebec No Drawing. Filed July 15, 1958, Ser. No. 748,607

1 Claim. (Cl. 260—618)

This invention relates to a process for the preparation of α-halogen-β-hydroxy alcohols useful as intermediates in the synthesis of pharmaceuticals, especially the antibiotic chloramphenicol. More particularly, it is concerned with a new and improved process for manufacturing DL-1-phenyl-2-bromo-1,3-propanediol and DL-1-p-nitrophenyl-2-bromo-1,3-propanediol which are valuable intermediates in the synthesis of pharmaceuticals, particularly chloramphenicol.

The process employed for the preparation of the compounds in question has consisted, until the present, of the treatment of cinnamyl alcohol or p-nitrocinnamyl alcohol or their esters, in an aqueous-organic solvent system such as water-ether or water-alcohol, with hypobromous acid prepared from bromine and water, usually in the presence of mercuric oxide. The amount of the relatively expensive mercuric oxide employed is usually nearly equal in weight to the amount of starting alcohol employed as shown in Cherbuliez, Neumeier and Lozeron, Helv. Chim. Acta 14, 186 (1931); Spanish Patent 192,762, J. Controulis et al., J. Am. Chem. Soc. 71, 2463 (1949); H. Bretschneider et al., Monatshefte 84, 1043 (1953).

In addition to the use of mercuric oxide, the presently employed procedures have the drawback in that the desired bromhydrin is contaminated with small amounts of the dibromide of the starting alcohol, formed simultaneously with the bromhydrin, by saturation of the double bond of the cinnamyl or p-nitrocinnamyl alcohols or their esters with two bromine atoms. Due to this latter contaminant, the reaction product obtained usually consists of an oily residue which is difficult to purify or to induce to crystallize. Indeed in most instances the oil must be used in this impure state as the starting material for further syntheses. The desirability of starting with pure products in any organic synthesis, in order to obtain maximum yields, is well recognized.

In marked contrast to the above procedures described in the literature, the process described herein gives, by a new and comparatively simple method, a high yield of pure (crystalline) DL-1-phenyl-2-bromo-1,3-propanediol or DL-1-p-nitrophenyl-2-bromo-1,3-propanediol with no formation of the undesired dibromo alcohols.

In accordance with the present invention, the formation of the undesired DL-1-phenyl-1,2-dibromo-3-propanol or corresponding p-nitrophenyl dibromide, can be avoided by bringing together an ether solution of cinnamyl alcohol or p-nitrocinnamyl alcohol I with N-bromosuccinimide II in water and shaking the biphasic mixture until two clear layers of liquid are obtained, whereby hypobromous acid is formed in situ and reacts with the unsaturated alcohol to form exclusively DL-1-phenyl-2-bromo-1,3-propanediol or DL-1-p-nitrophenyl-2-bromo-1,3-propanediol III with regeneration of succinimide IV, which may be recovered and reconverted to N-bromosuccinimide. The general reaction is indicated as follows:

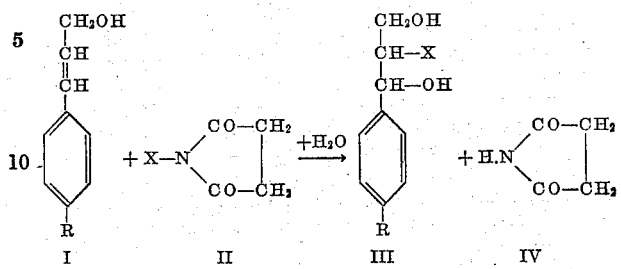

wherein R is a radical selected from the group consisting of hydrogen and nitro and X is a halogen selected from the group consisting of chlorine and bromine.

It is therefore possible to use a calculated amount of N-bromosuccinimide so that the exact amount of hypobromous acid required is made available for the total amount of cinnamyl alcohol present, thus avoiding the presence of free bromine and thus eliminating the possibility of forming the undesired dibromo alcohol.

It will be obvious to one familiar with the art that N-chlorosuccinimide may be used in place of N-bromosuccinimide in which case DL-1-phenyl-2-chloro-1,3-propanediol or DL-1-p-nitrophenyl-2-chloro1,3propanediol will be formed, and similarly by starting with an ester of either alcohol the corresponding hydroxy-halogen ester will be obtained.

The addition of hypobromous acid to the double bond of cinnamyl alcohol could give rise to four theoretically possible stereoisomeric racemates, two racemates of the chemical compound 1-phenyl-2-bromo-1,3-propanediol and two racemates of the chemical compound 1-phenyl-1-bromo-2,3-propanediol. No evidence was obtained for the presence of either of the two possible 1-bromo racemates. In addition the nearly quantitative yield of 1-phenyl-2-bromo-1,3-propanediol indicates that only one racemate of 1-phenyl-2-bromo-1,3-propanediol was formed. Similarly, p-nitrocinnamyl alcohol yielded only one racemate. The reaction of N-bromosuccinimide with either cinnamyl alcohol or p-nitro-cinnamyl alcohol is therefore highly specific not only structurally but also stereochemically since only one of the four possible DL-bromohydroxy derivatives was produced in each case.

More specifically, the novel process of the present invention comprises bringing together cinnamyl alcohol or p-nitrocinnamyl alcohol dissolved in an organic solvent and N-bromosuccinimide either dissolved or suspended in water, preferably at room temperature, whereby hypobromous acid is formed in situ and reacts with the unsaturated alcohol. The medium in which the reaction is carried out may be a mixture of water and a water-soluble organic solvent, for example, acetone, or a two-phase system consisting of water and a non-miscible organic solvent, for example, diethyl ether.

In carrying out the novel process of the present invention, a solution of cinnamyl alcohol or p-nitrocinnamyl alcohol in ether or in acetone is stirred (if acetone is the solvent) or shaken mechanically (if ether is the solvent) with a suspension or solution of N-bromosuccinimide in water, at room temperature for a period of time ranging from two and three quarter hours to twenty hours, or until the solution is clear. The amount of N-bromosuccinimide used is such that the theoretically required amount of hypobromous acid necessary to saturate the double bond of the cinnamyl alcohol or p-nitro-cinnamyl alcohol will be available. If it is preferred, a small excess of N-bromosuccinimide may be employed, which it was found does not alter the purity or yield of product produced.

If a mixture of a miscible organic solvent such as acetone and water is used, the acetone is now removed by distillation and the residual aqueous phase is extracted with a non-miscible organic solvent, for example, diethyl ether. The ether extract is washed with dilute sodium bicarbonate solution, then with water, dried over anhydrous magnesium sulfate, or sodium sulfate, filtered and concentrated to dryness. The residue solidifies spontaneously to a white crystalline mass which is essentially pure DL-1-phenyl-2-bromo-1,3-propanediol (if cinnamyl alcohol was used) or DL-1-p-nitrophenyl-2-bromo-1,3-propanediol (if p-nitrocinnamyl alcohol was used) in nearly quantitative yield, suitable for conversion to other products. However, if desired, either product may be recrystallized from an organic solvent, for example, chloroform or a mixture of organic solvents, such as chloroform-petroleum ether. Good yields are obtained on recrystallization.

If a two-phase system is employed for the reaction consisting of, for example, diethyl ether and water, then the ether phase is removed, the aqueous phase is extracted with diethyl ether and the combined ether solutions treated as outlined above.

The organic solvent employed both in the biphasic reaction medium and for extracting the final product from the aqueous phase may be diethyl ether or any other solvent in which the reaction product has a high solubility and succinimide has a low solubility.

If a mixture of organic solvent and water is employed, then the organic solvent is removed by distillation prior to the extraction of the reaction product from the aqueous phase with a solvent in which the reaction product has a high solubility and succinimide has a low solubility.

If a two-phase system is employed, the preferred organic phase is a solvent such as diethyl ether in which the produced DL-1-phenyl-2-bromo-1,3-propanediol or DL-1-p-nitrophenyl-2-bromo-1,3-propanediol will be readily soluble and the succinimide by-product insoluble. The separated ether phase containing the bulk of the product is then combined with the organic solvent extracts of the aqueous phase containing the remainder of the product.

The following examples are presented to show how the process of the present invention can be carried out, but it is understood that these examples are given primarily by way of illustration and not of limitation.

*Example I*

A mixture of 10 grams (0.056 mole) of p-nitro-cinnamyl alcohol, 11 grams (0.061 mole) of N-bromosuccinimide, 250 cc. diethyl ether and 100 cc. water, in a well-stoppered flask, was shaken mechanically for 20 hours at room temperature. After the first five hours of shaking, all of the N-bromosuccinimide had gone into solution and both liquid phases were clear and colourless. The water layer was separated and extracted with ether (2 x 35 cc.). The ether extracts and original ether phase were combined and washed with two percent sodium bicarbonate solution (2 x 30 cc.), then with water (2 x 35 cc.) till neutral, dried over anhydrous sodium sulfate, filtered and concentrated to dryness. The residual pale yellow viscous oil, on evacuation at room temperature, solidified completely to a mass of dense white crystals. The yield of DL-1-p-nitrophenyl -2-bromo-1,3-propanediol thus obtained was 14.8 grams (95.4%). Recrystallization from chloroform yields an analytically pure product M.P. 86–87°, whose formula is:

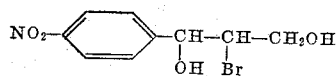

Calculated for $C_9H_{10}BrNO_4$: C, 39.15%; H, 3.65%; Br, 28.95%. Found: C, 39.23%; H, 3.66%; Br, 29.32%.

*Example II*

To a solution of two grams of p-nitrocinnamyl alcohol in 30 cc. acetone was added a solution of 2.2 g. N-bromosuccinimide in 30 cc. water. The clear homogeneous solution was allowed to stand at room temperature for twenty hours. The bulk of the acetone was then removed by distillation. The residual colourless aqueous phase was then extracted with ether (3 x 40 cc.). The combined ether extracts were worked up as in Example I, yielding 2.9 grams DL-p-nitrophenyl -2-bromo-1,3-propanediol (theoretical yield 3.1 grams).

*Example III*

A mixture of 26.8 grams (0.2 mole) of cinnamyl alcohol, 38 grams (0.22 mole) N-bromosuccinimide, 300 cc. diethyl ether and 150 cc. water, in a well-stoppered flask was shaken mechanically for 2.75 hours at room temperature. The two clear colourless phases were separated. The aqueous layer was extracted with diethyl ether (2 x 100 cc.). The ether extracts and the original ether phase were combined and washed with two percent sodium bicarbonate solution (2 x 50 cc.), then with water (3 x 50 cc.) till neutral, dried over anhydrous magnesium sulfate, filtered and concentrated to dryness. The residual pale yellow viscous oil either on refrigeration, or evacuation at room temperature, solidified completely to a mass of dense white crystals of DL-1-phenyl-2-bromo-1,3-propanediol which is sufficiently pure for conversion to other products. The weight of product thus obtained was 44.7 grams (96.9% of theory). Recrystallization from chloroform or a mixture of chloroform-petroleum ether yielded an analytically pure product, M.P. 63–64° whose formula is:

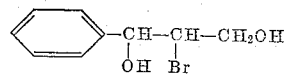

Calculated for $C_9H_{11}BrO_2$: C, 46.77%; H, 4.79%; Br, 34.58%. Found: C, 46.99%; H, 5.05%; Br, 34.65%.

I claim:

A process for preparing α-halogen-β-hydroxy alcohols of the general formula:

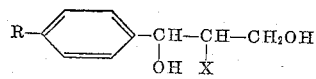

wherein R is a radical selected from the group consisting of hydrogen and nitro and X is a halogen selected from the group consisting of chlorine and bromine, comprising bringing together a compound selected from the group consisting of cinnamyl alcohol and paranitrocinnamyl alcohol and a succinimide selected from the group consisting of N-bromosuccinimide and N-chloro succinimide in an organic-aqueous medium selected from the group consisting of an acetone-water solution and a water-diethyl ether mixture and whereby the corresponding halogenous acid is generated in situ, whereby said hypobromous acid is added to the double bond of the starting material to form exclusively an α-halogen-β-hydroxy alcohol selected from the group consisting of DL-1-phenyl-2-bromo-1,3-propanediol and DL-1-p-nitrophenyl-2-bromo-1,3-propanediol.

References Cited in the file of this patent

Guss et al.: Jour. Amer. Chem. Soc., vol. 77 (1955), page 2549 (1 page).